(12) United States Patent
Kobayashi et al.

(10) Patent No.: US 10,234,929 B2
(45) Date of Patent: Mar. 19, 2019

(54) STORAGE SYSTEM AND CONTROL APPARATUS

(71) Applicant: FUJITSU LIMITED, Kawasaki-shi, Kanagawa (JP)

(72) Inventors: Hidefumi Kobayashi, Yokohama (JP); Satoshi Yazawa, Kawasaki (JP); Atsushi Igashira, Yokohama (JP); Wataru Iizuka, Kawasaki (JP); Motohiro Sakai, Nerima (JP); Akihito Kobayashi, Kawasaki (JP); Shinichiro Matsumura, Kawasaki (JP); Kenji Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 502 days.

(21) Appl. No.: 15/077,999

(22) Filed: Mar. 23, 2016

(65) Prior Publication Data
US 2016/0321175 A1    Nov. 3, 2016

(30) Foreign Application Priority Data

Apr. 30, 2015    (JP) .................................. 2015-093475

(51) Int. Cl.
*G06F 1/32*        (2006.01)
*G06F 12/0804*     (2016.01)
(Continued)

(52) U.S. Cl.
CPC ........ *G06F 1/3275* (2013.01); *G06F 12/0804* (2013.01); *G06F 12/0868* (2013.01);
(Continued)

(58) Field of Classification Search
CPC ............. G06F 1/3275; G06F 2212/283; G06F 12/0804; G06F 12/0871; G06F 2212/1028; G06F 12/0868
See application file for complete search history.

(56) References Cited

U.S. PATENT DOCUMENTS 5,007,027 A  *  4/1991  Shimoi ..................... G06F 1/30
                                                365/229
2001/0049768 A1    12/2001  Kato et al.
(Continued)

FOREIGN PATENT DOCUMENTS

JP            63-5539         1/1988
JP       2001-344154 A       12/2001
(Continued)

OTHER PUBLICATIONS

Japanese Office Action dated Nov. 6, 2018 for corresponding Japanese Patent Application No. 2015-093475, with English Translation, 7 pages.

*Primary Examiner* — Reginald G Bragdon
*Assistant Examiner* — Hannah A Faye-Joyner
(74) *Attorney, Agent, or Firm* — Fujitsu Patent Center

(57) ABSTRACT

A first control apparatus includes a first memory unit including a local cache, a first power supply that supplies electric power to the first memory unit, and a control unit. The control unit controls a write into a memory device by a write-back method, using the local cache. The control unit mirrors data of the local cache in a mirror cache of a second control apparatus. The control unit determines whether the mirror cache is included in a second memory unit that receives electric power from a second power supply of the second control apparatus, upon detecting an abnormal state of a battery for supplying electric power to the second memory unit in case of power outage of the second power supply. The second memory unit switches write control for the memory device to a write-through method, when the second memory unit includes the mirror cache.

6 Claims, 15 Drawing Sheets

(51) Int. Cl.
  *G06F 12/0868* (2016.01)
  *G06F 12/0871* (2016.01)
  *G06F 1/3234* (2019.01)

(52) U.S. Cl.
  CPC .. *G06F 12/0871* (2013.01); *G06F 2212/1028* (2013.01); *G06F 2212/283* (2013.01); *Y02D 10/13* (2018.01)

(56) References Cited

U.S. PATENT DOCUMENTS

| | | | |
|---|---|---|---|
| 2005/0216660 A1 | 9/2005 | Kobayashi et al. | |
| 2011/0191535 A1* | 8/2011 | Yuasa | G06F 12/08 711/113 |
| 2011/0197036 A1 | 8/2011 | Ishii | |

FOREIGN PATENT DOCUMENTS

| | | |
|---|---|---|
| JP | 2011-164780 A | 8/2011 |
| WO | 2004/114115 | 12/2004 |

\* cited by examiner

| VOLUME MANAGEMENT TABLE | | | |
|---|---|---|---|
| LUN | LOCAL CACHE | MIRROR CACHE | PHYSICAL MEMORY REGION |
| LUN #1 | CM #1 | CM #3 | DISK #0001, #0002 |
| LUN #6 | CM #6 | CM #1 | DISK #1001, #1002 |
| ... | ... | ... | ... |

FIG. 6

STORAGE SYSTEM AND CONTROL APPARATUS

CROSS-REFERENCE TO RELATED APPLICATION

This application is based upon and claims the benefit of priority of the prior Japanese Patent Application No. 2015-093475, filed on Apr. 30, 2015, the entire contents of which are incorporated herein by reference.

FIELD

The embodiments discussed herein relate to a storage system and a control apparatus.

BACKGROUND

Write-back is known as a data write method using a cache. For example, when controlling a write into a memory device by the write-back method, a control apparatus replies to a host when write data transmitted from the host is written into a cache. Then, the control apparatus writes the write data of the cache into the memory device asynchronously from the write into the cache, within an idle time during subsequent processes for example.

Here, as one example of technology relevant to cache control, the next technology is proposed. In this technology, a battery monitoring circuit monitors a battery for supplying electric power to a cache memory at the time of power outage. The disk control circuit controls a disk to perform a write-back operation when the battery monitoring circuit determines that the battery is in a normal state, and controls the disk to perform a write-through operation when the battery monitoring circuit determines that the battery is in an abnormal state.

Also, in a proposed storage system, a plurality of control apparatuses include respective local caches and mirror caches, and the local cache of a certain control apparatus is duplicated in the mirror cache of an adjacent control apparatus, so that the caches are duplicated cyclically.

See, for example, Japanese Laid-open Utility Model Publication No. 63-5539 and International Publication Pamphlet No. WO 2004/114115.

In the meantime, as an example of a storage system including a plurality of control apparatuses, one can conceive of a system including control apparatuses each having a cache battery. For example, one can conceive of a system including control apparatuses provided in different housings. In this system, an abnormal state of the battery of a certain control apparatus increases the risk of losing data of a cache of the control apparatus, and thus the control apparatus performs an operation for protecting the data of the cache.

However, when the caches are cyclically duplicated as described above in this system, an abnormal state of the battery of a certain control apparatus increases not only the risk of data loss of the local cache in the control apparatus, but also the risk of data loss of the mirror cache in the control apparatus. This compromises safety of not only the data in the control apparatus, but also data of a local cache in another control apparatus corresponding to the mirror cache. That is, the cyclically duplicated cache configuration has a problem of compromising the safety of data in another control apparatus other than the control apparatus including the battery in an abnormal state.

SUMMARY

According to one aspect, there is provided a storage system including: a first memory device; a second memory device; a first control apparatus including: a first memory having a first cache region and a mirror cache region, a first power supply configured to supply electric power to the first memory, a battery configured to supply electric power to the first memory at a time of power outage of the first power supply, and a first processor configured to control a write into the first memory device by a write-back method by using the first cache region, and switch write control for the first memory device to a write-through method upon detecting an abnormal state of the battery; and a second control apparatus including: a second memory having a second cache region, a second power supply configured to supply electric power to the second memory, the second power supply being different from the first power supply, and a second processor configured to control a write into the second memory device by the write-back method by using the second cache region, and mirror data of the second cache region in the mirror cache region, and switch write control for the second memory device to the write-through method upon detecting an abnormal state of the battery.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a volume management table;

DESCRIPTION OF EMBODIMENTS

Figure 1:
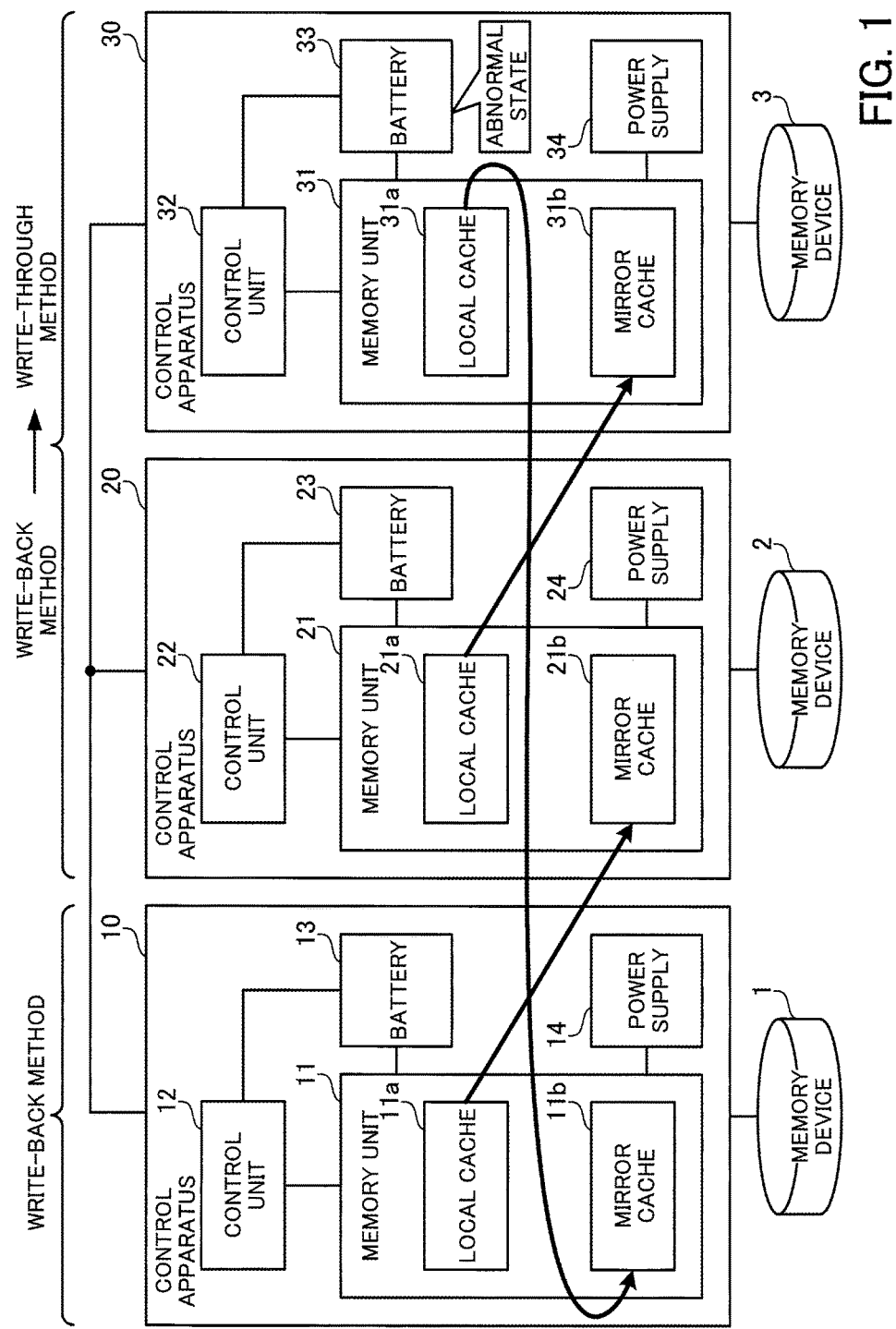
FIG. 1 illustrates a storage system of a first embodiment.

Several embodiments will be described below with reference to the accompanying drawings, wherein like reference numerals refer to like elements throughout.

First Embodiment

FIG. 1 illustrates a storage system of the first embodiment. The storage system illustrated in FIG. 1 includes memory devices 1, 2, and 3 and control apparatuses 10, 20, and 30. The control apparatuses 10, 20, and 30 are connected to each other via a network or a bus, for example. Also, in FIG. 1, the memory device 1 is connected to the control apparatus 10, and the memory device 2 is connected to the control apparatus 20, and the memory device 3 is connected to the control apparatus 30, for example.

Note that the control apparatus 10 and the memory device 1 are configured with a storage device in a housing, for example. In the same way, the control apparatus 20 and the memory device 2 are configured with a storage device in a housing, and the control apparatus 30 and the memory device 3 are configured with a storage device in a housing, for example.

The control apparatus 10 controls an access to the memory device 1 and includes a memory unit 11, a control unit 12, a battery 13, and a power supply 14. The control apparatus 20 controls an access to the memory device 2 and includes a memory unit 21, a control unit 22, a battery 23, and a power supply 24. The control apparatus 30 controls an access to the memory device 3 and includes a memory unit 31, a control unit 32, a battery 33, and a power supply 34.

The memory units 11, 21, and 31 are volatile memory devices, such as random access memory (RAM). The control units 12, 22, and 32 are configured with processors, which can be a central processing unit (CPU), a digital signal processor (DSP), an application specific integrated circuit (ASIC), a field programmable gate array (FPGA), or the like. Each processor can be a group of processors (multiprocessor).

Note that the memory device 1 for which the control apparatus 10 performs an access control is needless to be connected directly to the control apparatus 10, and may be connected to another control apparatus, for example. In the same way, the memory device 2 is needless to be connected directly to the control apparatus 20, and the memory device 3 is needless to be connected directly to the control apparatus 30.

The memory unit 11 includes a local cache 11a and a mirror cache 11b as memory regions. The memory unit includes a local cache 21a and a mirror cache 21b as memory regions. The memory unit 31 includes a local cache 31a and a mirror cache 31b as memory regions.

The control unit 12 controls a data write into the memory device 1 by using the local cache 11a as a cache region. Normally, the control unit 12 controls a write using the local cache 11a by the write-back method. Also, the control unit 12 mirrors the data of the local cache 11a in the mirror cache 21b of the control apparatus 20.

The control unit 22 controls a data write into the memory device 2 by using the local cache 21a as a cache region. Normally, the control unit 22 controls a write using the local cache 21a by the write-back method. Also, the control unit 22 mirrors the data of the local cache 21a in the mirror cache 31b of the control apparatus 30.

The control unit 32 controls a data write into the memory device 3 by using the local cache 31a as a cache region. Normally, the control unit 32 controls a write using the local cache 31a by the write-back method. Also, the control unit 32 mirrors the data of the local cache 31a in the mirror cache 11b of the control apparatus 10.

As described above, in the control apparatuses 10, 20, and 30, a mirror cache corresponding to a local cache of one control apparatus is located in another control apparatus adjacent to the one control apparatus. With this configuration, the caches are mirrored cyclically. The mirror data of the local cache of a certain control apparatus is stored in another control apparatus, so that either one of original data or mirror data is not lost even when the operation of one of these control apparatuses stops. Thus, with the above configuration, safety of cache data is increased against device malfunction.

The power supply 14 supplies electric power to components, at least the memory unit 11, of the control apparatus 10. The battery 13 supplies electric power to the memory unit 11 at the time of power outage of the power supply 14. The power supply 24 supplies electric power to components, at least the memory unit 21, of the control apparatus 20. The battery 23 supplies electric power to the memory unit 21 at the time of power outage of the power supply 24. The power supply 34 supplies electric power to components, at least the memory unit 31, of the control apparatus 30. The battery 33 supplies electric power to the memory unit 31 at the time of power outage of the power supply 34.

As described above, the memory units 11, 21, and 31 receive electric power from the power supplies 14, 24, and 34 respectively, in order to operate. Also, at the time of power outage of the power supply 14, data of the memory unit 11, including data of the local cache 11a and the mirror cache 11b, is maintained by the battery 13. In the same way, at the time of power outage of the power supply 24, data of the memory unit 21, including data of the local cache 21a and the mirror cache 21b, is maintained by the battery 23. Also, at the time of power outage of the power supply 34, data of the memory unit 31, including data of the local cache 31a and the mirror cache 31b, is maintained by the battery 33.

Next, a process executed when the battery 33 of the control apparatus 30 is abnormal will be described as an example. In the following description, the control apparatuses 10, 20, and 30 are assumed to be initially set to execute write control by the write-back method. Note that, in the description of the following exemplary process, the data of the local cache 31a is not necessarily mirrored in the mirror cache 11b.

If the battery 33 becomes abnormal, all of the control apparatuses 10, 20, and 30 detect the fact. For example, upon detecting an abnormal state of the battery 33, the control unit 32 reports the fact to a predetermined representative apparatus of the control apparatuses 10, 20, and 30. The representative apparatus that has received the report reports every other device that the battery 33 of the control apparatus 30 is abnormal. Thereby, all of the control apparatuses 10, 20, and 30 are informed that the battery 33 is abnormal. Note that the abnormal state of the battery 33 may include malfunction of the battery 33 in which the charge rate of the battery 33 is smaller than a predetermined threshold value, as well as a case in which the output voltage of the battery 33 is 0, for example.

Upon detecting an abnormal state of a battery of a certain control apparatus, each of the control units 12, 22, and 32 determines whether the battery is provided in the control apparatus including the control unit, and whether the battery supplies electric power to the memory unit including the mirror cache corresponding to the local cache of the control apparatus including the control unit. Then, each of the control units 12, 22, and 32 execute control according to results of these determination.

Specifically, upon detecting an abnormal state of the battery 33, the control unit 12 determines that the battery 33 is not provided in the control apparatus 10, and that the battery 33 does not supply electric power to the memory unit 31 including the mirror cache 21b corresponding to the local cache 11a. In this case, the possibility of data loss does not increase for each of the local cache 11a and the mirror cache 21b. Hence, the control unit 12 continues data write control by the write-back method with respect to the memory device 1.

Upon detecting an abnormal state of the battery 33, the control unit 22 determines that the battery 33 is not provided in the control apparatus 20, and that the battery 33 supplies electric power to the memory unit 31 including the mirror cache 31b corresponding to the local cache 21a. In this case, if the control apparatus 30 stops operating due to a reason such as power outage of the power supply 34, it is highly possible that the data of the mirror cache 31b is lost. In that meaning, safety of the data of the local cache 21a decreases.

Hence, the control unit 22 switches the data write control for the memory device 2 from the write-back method to the write-through method. Practically, the control unit 22 reflects all data of the local cache 21a in the memory device 2, and thereafter starts the write control by the write-through method. Thereby, the data of the local cache 21a is always synchronized with the data of the memory device 2, and the safety of the data of the local cache 21a increases. Note that operation of mirroring data of the local cache 21a in the mirror cache 31b may be stopped.

Also, upon detecting an abnormal state of the battery 33, the control unit 32 determines that the battery 33 is provided in the control apparatus 30. In this case, if the control apparatus 30 stops operating due to a reason such as power outage of the power supply 34, it is highly possible that the data of the local cache 31a is lost, and in that meaning, safety of the data of the local cache 31a decreases.

Hence, the control unit 32 switches the data write control for the memory device 3 from the write-back method to the write-through method. Practically, the control unit 32 reflects all data of the local cache 31a in the memory device 3, and thereafter starts write control by the write-through method. Thereby, the data of the local cache 31a is always synchronized with the data of the memory device 3, and safety of the data of the local cache 31a increases.

According to the above first embodiment, when the battery 33 is abnormal, not only the control unit 32 of the control apparatus 30 including the battery 33, but also the control unit 22 of the control apparatus 20 that mirrors the data of the local cache 21a in the control apparatus 30 switches the write control from the write-back method to the write-through method. Thereby, the possibility of data loss is reduced, not only for the local cache 31a of the control apparatus 30, but also for the local cache 21a of the control apparatus 20.

Second Embodiment

Figure 2:
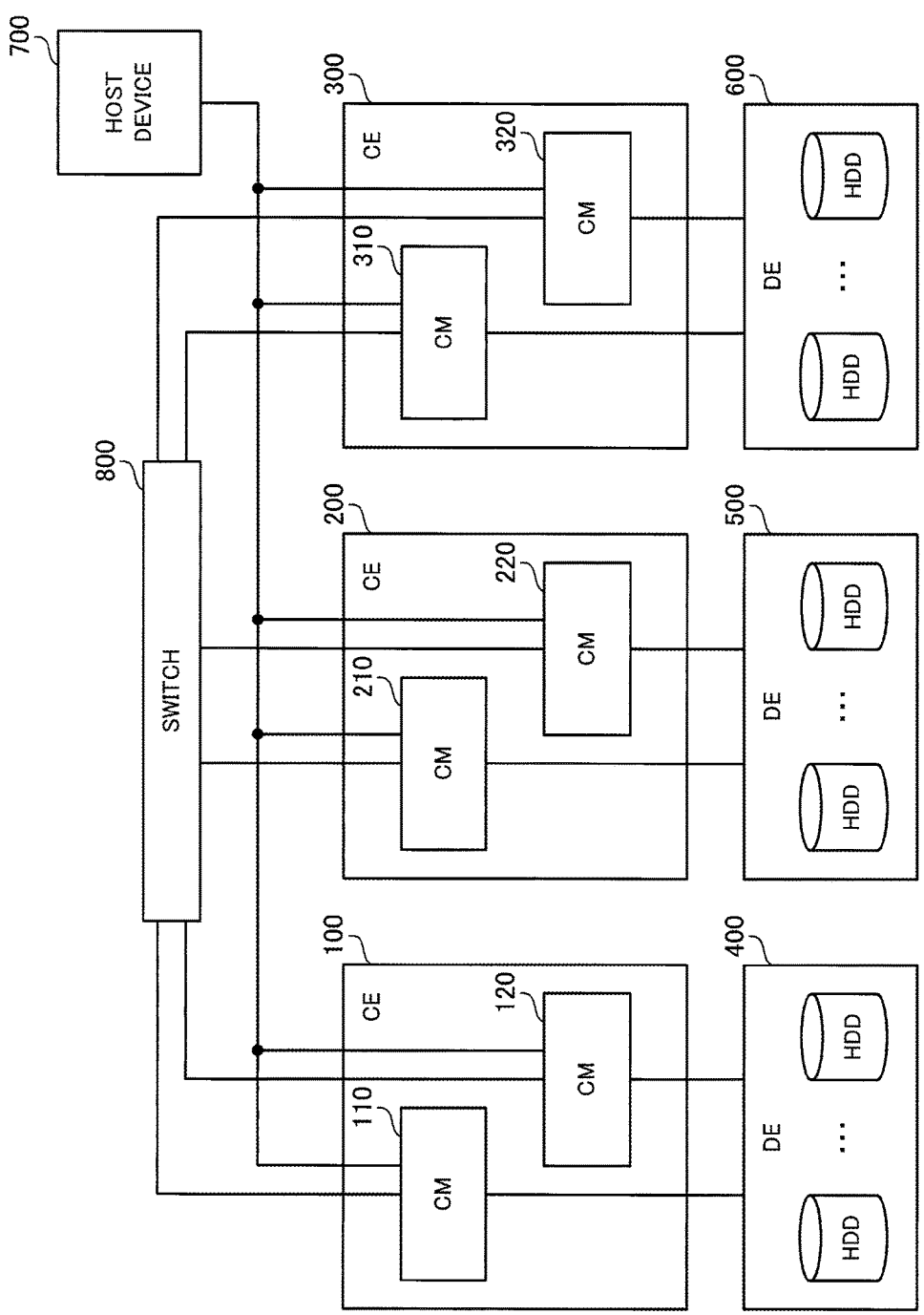
FIG. 2 illustrates a storage system of a second embodiment.

FIG. 2 illustrates a storage system of the second embodiment. The storage system illustrated in FIG. 2 includes controller enclosures (CE) 100, 200, and 300, drive enclosures (DE) 400, 500, and 600, a host device 700, and a switch 800.

The controller enclosure 100 includes controller modules (CM) 110 and 120. The controller enclosure 200 includes controller modules 210 and 220. The controller enclosure 300 includes controller modules 310 and 320. The controller modules 110, 120, 210, 220, 310, and 320 are connected to each other via the switch 800. The controller modules 110, 120, 210, 220, 310, and 320 are connected to the switch 800 by a peripheral component interconnect (PCI) express bus, for example.

Also, the host device 700 is connected to the controller modules 110, 120, 210, 220, 310, and 320. The controller modules 110, 120, 210, 220, 310, and 320 are connected to the host device 700 via a storage area network (SAN) using a fiber channel (FC), an internet small computer system interface (iSCSI), or the like, for example. Although in the example of FIG. 2 one host device 700 is connected to the controller modules 110, 120, 210, 220, 310, and 320, a plurality of host devices may be connected to one or more controller modules.

A plurality of memory devices are provided in each of the drive enclosures 400, 500, and 600. In the present embodiment, the drive enclosures 400, 500, and 600 are disk array devices including hard disk drives (HDDs) as memory devices. Note that the memory devices provided in the drive enclosures 400, 500, and 600 may be memory devices of other types, such as solid state drive (SSD).

The drive enclosure 400 is connected to the controller modules 110 and 120. The controller modules 110 and 120 control an access to the HDDs provided in the drive enclosure 400, in response to a request from the host device 700. The drive enclosure 500 is connected to the controller modules 210 and 220. The controller modules 210 and 220 control an access to the HDDs provided in the drive enclosure 500, in response to a request from the host device 700. The drive enclosure 600 is connected to the controller modules 310 and 320. The controller modules 310 and 320 control an access to the HDDs provided in the drive enclosure 600, in response to a request from the host device 700.

Note that the controller enclosure 100 and the drive enclosure 400 form a storage device contained in one housing, for example. The controller enclosure 200 and the drive enclosure 500, as well as the controller enclosure 300 and the drive enclosure 600, is configured in the same way. The storage system of FIG. 2 has a scale-out configuration of these storage devices.

Also, the number of controller enclosures included in the storage system is not limited to 3, and the number of controller modules included in each controller enclosure is not limited to 2. For example, the storage system may include twelve controller enclosures each including two controller modules.

Figure 3:
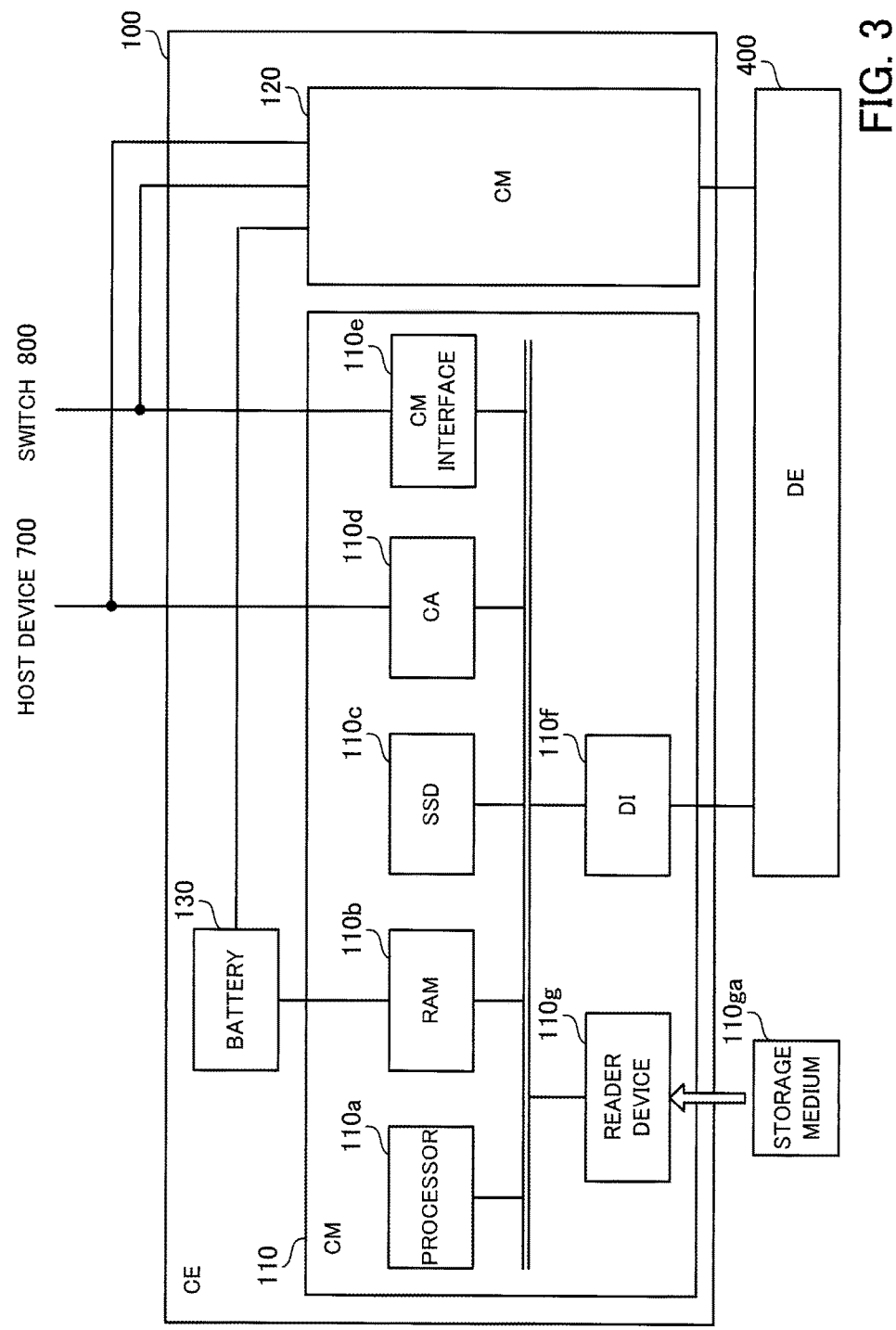
FIG. 3 illustrates exemplary hardware of a controller module.

FIG. 3 illustrates exemplary hardware of a controller module. The controller module 110 includes a processor 110a, a RAM 110b, an SSD 110c, a channel adapter (CA) 110d, a controller module interface 110e, a device interface (DI) 110f, and a reader device 110g.

The processor 110a controls information processing of the controller module 110. The processor 110a may be a multiprocessor including a plurality of processing elements.

The RAM 110b is a main memory device of the controller module 110. The RAM 110b temporarily stores at least a part of an operating system (OS) program and application programs executed in the processor 110a. Also, the RAM 110b stores various types of data used in processing by the processor 110a.

The SSD 110c is an auxiliary memory device of the controller module 110. The SSD 110c is a non-volatile semiconductor memory. The OS program, the application programs, and various types of data are stored in the SSD 110c. Note that the controller module 110 may include an HDD as an auxiliary memory device, instead of the SSD 110c.

The channel adapter 110d is an interface for communicating with the host device 700. The controller module interface 110e is provided to communicate with another controller module via the switch 800. The device interface 110f is provided to communicate with the drive enclosure 400.

The reader device 110g reads programs and data stored in a portable storage medium 110ga. The storage medium 110ga may be a magnetic disk such as a flexible disk (FD) and an HDD, an optical disc such as a compact disc (CD) and a digital versatile disc (DVD), and a magneto-optical disk (MO), for example. Also, the storage medium 110ga may be a non-volatile semiconductor memory, such as a flash memory card, for example. For example, the reader device 110g transmits programs and data read from the storage medium 110ga, to the processor 110a, in accordance with a command from the processor 110a.

Note that the controller modules 120, 210, 220, 310, and 320 can be configured with the same hardware as the controller module 110.

Also, the controller enclosure 100 includes a battery 130. The battery 130 supplies electric power to the RAM 110b and the RAM included in the controller module 120 at the time of power outage.

Figure 4:
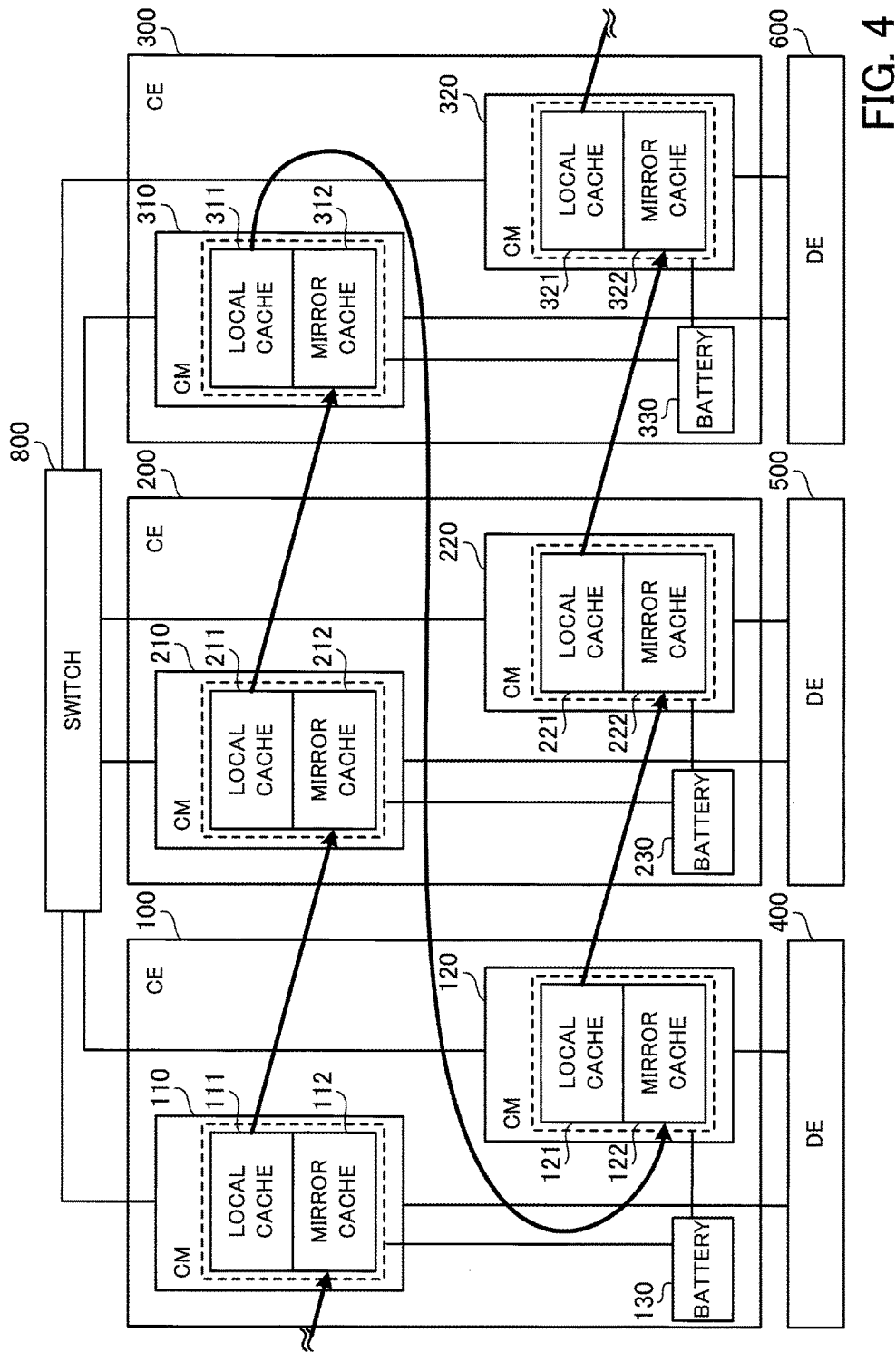
FIG. 4 illustrates a relationship between cache regions and mirroring destinations.

FIG. 4 illustrates a relationship between cache regions and mirroring destinations. In the storage system of the present embodiment, data read and data write between the controller modules and the host device 700 are performed with respect to each logical memory region, which is referred to as a logical unit (LU). There are a plurality of logical units in the storage system, and a controller module is assigned to each logical unit to control an access from the host device 700 to the logical unit. A controller module controls an access to a logical unit assigned to the controller module, by using a cache region allocated in the RAM of the controller module. In the RAM, a cache region is allocated to each logical unit.

In FIG. 4, to simplify explanation, each of the controller modules 110, 120, 210, 220, 310, and 320 is assumed to control an access to one logical volume in response to an access request from the host device 700. In this case, one cache region (a local cache described later) is allocated in each RAM of the controller modules 110, 120, 210, 220, 310, and 320.

A physical memory region corresponding to a logical unit for which a certain controller module performs access control is configured with one or more HDDs provided in the drive enclosures 400, 500, and 600. In the simplest example, a physical memory region corresponding to a logical unit for which a certain controller module performs access control is configured with one or more HDDs in the drive enclosure connected to the controller module. For example, one or more HDDs in the drive enclosure 400 are assigned as a physical memory region corresponding to a logical unit for which the controller module 110 performs access control. Also, normally, a plurality of HDDs are assigned to one logical unit, and data read and data write for those HDDs are controlled by RAID (Redundant Arrays of Inexpensive Disks).

As illustrated in FIG. 4, in the controller module 110, a local cache 111 and a mirror cache 112 are allocated in a memory region of the RAM 110b. In the controller module 120, a local cache 121 and a mirror cache 122 are allocated in a memory region of the RAM included in the controller module 120. In the controller module 210, a local cache 211 and a mirror cache 212 are allocated in a memory region of the RAM included in the controller module 210. In the controller module 220, a local cache 221 and a mirror cache 222 are allocated in a memory region of the RAM included in the controller module 220. In the controller module 310, a local cache 311 and a mirror cache 312 are allocated in a memory region of the RAM included in the controller module 310. In the controller module 320, a local cache 321 and a mirror cache 322 are allocated in a memory region of the RAM included in the controller module 320.

A local cache is used as a cache region, when a corresponding controller module accesses a logical unit that the controller module is in charge of in response to a request from the host device 700. For example, the controller module 110 controls an access to a logical unit according to a request from the host device 700, by using the local cache 111 as a cache region. Also, the controller module 210 controls an access to a logical unit according to a request from the host device 700, by using the local cache 211 as a cache region.

Note that, normally, a controller module controls data write into a logical unit by the write-back method. That is, when receiving a write request from the host device 700, a controller module stores write data in a local cache and transmits a write completion report to the host device 700. Thereafter, the controller module stores the write data stored in the local cache, in a corresponding physical memory region (HDD), at a predetermined time point. Also, as described later, a controller module can change write control for a logical unit to the write-through method.

Mirror data of another local cache is contained in a mirror cache. For example, the controller module 110 mirrors the data contained in the local cache 111, in the mirror cache 212. The controller module 210 mirrors the data contained in the local cache 211, in the mirror cache 312. The controller module 310 mirrors the data contained in the local cache 311, in the mirror cache 122. The controller module 120 mirrors the data contained in the local cache 121, in the mirror cache 222. The controller module 220 mirrors the data contained in the local cache 221, in the mirror cache 322. The controller module 320 mirrors the data contained in the local cache 321, in the mirror cache 112.

As described above, a local cache of a certain controller module is cyclically mirrored in an adjacent controller module. Note that a local cache of a certain controller module is mirrored in a controller module in a controller enclosure different from a controller enclosure provided with the certain controller module. With this configuration, even when a controller enclosure unit stops its operation, at least one of original data and mirror data is not lost but maintained, with respect to every local cache.

In an exemplary case, the local cache 111 of the controller module 110 is mirrored in the mirror cache 122 of the controller module 120. With this configuration, when the operation of the controller enclosure 100 stops, both of the data contained in the local cache 111 and the mirror data contained in the mirror cache 122 are lost. In contrast, in the example of FIG. 4, the local cache 111 of the controller module 110 is mirrored in the mirror cache 212 of the controller module 210. Hence, even when the operation of the controller enclosure 100 stops, the mirror data of the mirror cache 212 remains, and conversely, even when the operation of the controller enclosure 200 stops, the original data of the local cache 111 remains.

In the meantime, the controller enclosure 100 includes the battery 130. The battery 130 supplies electric power to the RAM including the local cache 111 and the mirror cache 112 and the RAM including the local cache 121 and the mirror cache 122 at the time of power outage. Thereby, even when the controller enclosure 100 suffers power outage, the data of the local caches 111 and 121 and the mirror caches 112 and 122 are not erased but maintained, in order to allow measure, such as evacuating these data to a non-volatile memory device, to be taken.

The controller enclosure 200 includes the battery 230 in the same way. The battery 230 supplies electric power to the RAM including the local cache 211 and the mirror cache 212 and the RAM including the local cache 221 and the mirror cache 222 at the time of power outage. The controller enclosure 300 includes the battery 330 in the same way. The battery 330 supplies electric power to the RAM including the local cache 311 and the mirror cache 312 and the RAM including the local cache 321 and the mirror cache 322 at the time of power outage.

Here, it is assumed that malfunction of the battery 230 occurs, while the controller modules 110, 120, 210, 220, 310, and 320 are controlling a write into a logical unit by the write-back method. Note that, in the following description, "write-back operation" indicates a state in which a controller module is controlling a write into a logical unit by the write-back method, and "write-through operation" indicates a state in which the controller module is controlling a write into a logical unit by the write-through method.

One can conceive of a method to switch the controller modules 210 and 220 included in the controller enclosure 200 from the write-back operation to the write-through operation when malfunction of the battery 230 occurs. This is because, if power outage occurs subsequently, the data contained in the local caches 211 and 221 are lost. The controller modules 210 and 220 are switched to the write-through operation, in order to store the data of the local caches 211 and 221 in the corresponding physical memory region (HDD), and thereby prevent data loss even if power outage occurs.

However, if the controller modules 210 and 220 are switched to the write-through operation and thereafter power outage occurs, the data contained in the mirror caches 212 and 222 are lost. In this case, the data of the local caches 111 and 121 are not duplicated, and safety of the data of the local caches 111 and 121 decreases. For example, there is a problem that data is unable to be restored when the data contained in the local caches 111 and 121 are lost thereafter.

Also, as another method, one can conceive of a method to switch all of the controller modules 110, 120, 210, 220, 310, and 320 from the write-back operation to the write-through operation when malfunction of the battery 230 occurs. For example, this is the same control method as a non-scale-out configuration in which all controller modules are contained in the same housing (controller enclosure). According to this method, possibility of data loss is reduced with respect to all data of the local caches 111, 121, 211, 221, 311, and 321. However, this method has a problem that the speed of replying an access to a logical unit decreases in all controller modules, and the access performance of the entire storage system significantly deteriorates.

In order to solve this, in the second embodiment, not only the controller modules 210 and 220 that receive electric power from the battery 230 at the time of power outage, but also the controller modules 110 and 120 that mirror their local caches in the controller modules 210 and 220, switch from the write-back operation to the write-through operation, when malfunction of the battery 230 occurs. By switching the controller modules 110 and 120 to the write-through operation, the data contained in the local caches 111 and 121 are stored in the corresponding physical memory region (HDD), so as to prevent data lose. Also, by switching only the controller modules 110, 120, 210, and 220 to the write-through operation, access performance is improved more than when all controller modules are switched to the write-through operation.

Figure 5:
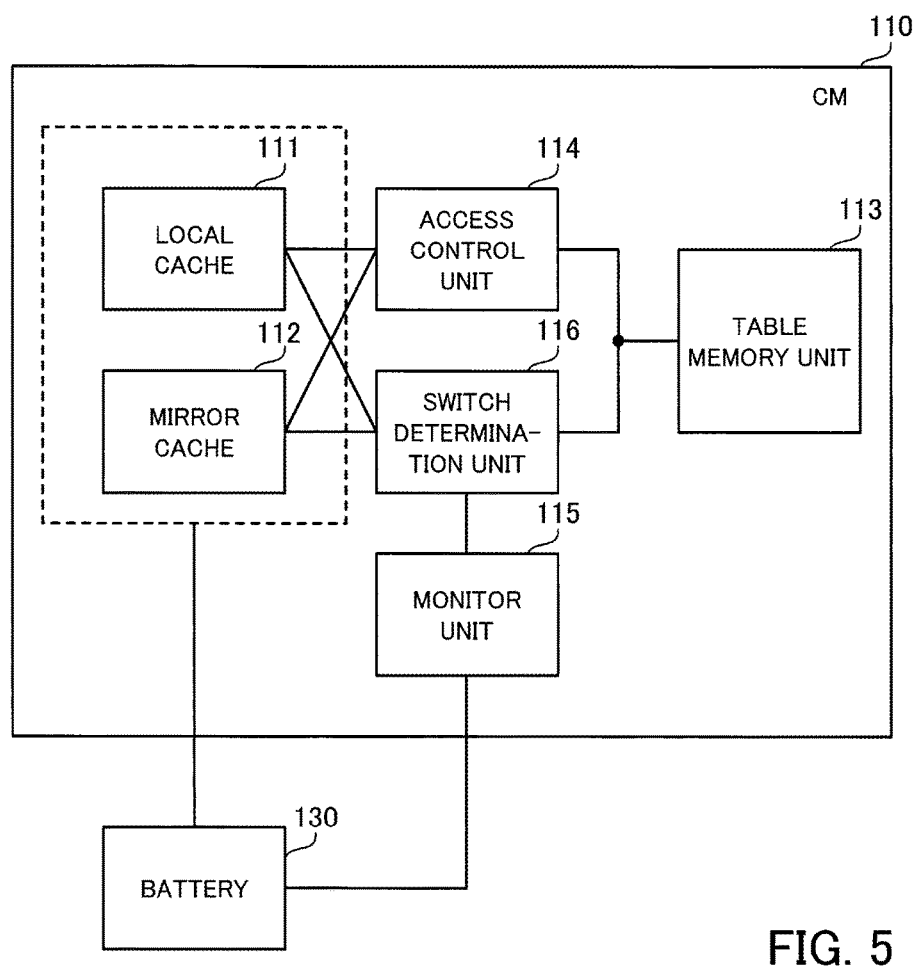
FIG. 5 illustrates an exemplary function of a controller module.

FIG. 5 illustrates an exemplary function of a controller module. The controller module 110 includes a local cache 111, a mirror cache 112, a table memory unit 113, an access control unit 114, a monitor unit 115, and a switch determination unit 116. For example, the table memory unit 113 is a memory region allocated in the RAM 110$b$ or the SSD 110$c$. The access control unit 114, the monitor unit 115, and the switch determination unit 116 are program modules executed by the processor 110$a$, for example.

The table memory unit 113 includes a volume management table and a flag management table. The volume management table includes information indicating correspondence relationship between logical units, physical memory regions, positions of local caches, and positions of mirror caches. The flag management table includes information indicating which one of its own controller enclosure or another controller enclosure includes a causal battery in an abnormal state.

Also, the table memory unit 113 stores information indicating which one of the write-back operation or the write-through operation the controller module 110 is operated by at the present moment. Also, the table memory unit 113 stores information indicating a correspondence relationship between batteries and controller enclosures. For example, the table memory unit 113 stores information indicating a correspondence relationship between the battery 230 and the controller enclosure 200. This information indicates that the controller enclosure 200 includes the battery 230.

The access control unit 114 controls an access to a logical unit in response to an access request from the host device 700. In this access control, the access control unit 114 uses the local cache 111 as a cache region. Also, the access control unit 114 switches the control method of a write into a logical unit, between the write-back method and the write-through method.

For example, in the write-back operation, the access control unit 114 stores received write data in the local cache 111, when receiving a data write request from the host device 700. The access control unit 114 reports the host device 700 that the write data has been written. Thereafter, the access control unit 114 stores the write data contained in the local cache 111, in a corresponding HDD. Also, the access control unit 114 copies the write data contained in the local cache 111, and causes the controller module 210 to store the copied data in the mirror cache 212. Thereby, the write data received from the host device 700 is duplicated in the local cache 111 and the mirror cache 212. Note that data transfer to the controller module 210 is performed via the switch 800.

On the other hand, in the write-through operation, the access control unit 114 writes received write data into the local cache 111 and the corresponding HDD, when receiving a data write request from the host device 700. The access control unit 114 stores the write data in the local cache 111 and the HDD, and thereafter reports the host device 700 that the write data has been written.

Also, the access control unit 114 stores, in the mirror cache 112, mirror data corresponding to the local cache 321, which is transferred from the controller module 320.

The monitor unit 115 monitors the state of the battery 130. Note that, as described later, the monitor unit 115 operates only when the controller module 110 is set as a controller enclosure master or a master controller module.

As described later, the switch determination unit 116 receives a battery state report indicating that a battery is in an abnormal state, from a master controller module. Here, the abnormal state refers to a situation in which a battery malfunctions, and a situation in which the charge rate of a battery is smaller than a threshold value, for example. The switch determination unit 116 determines whether to switch the access control unit 114 from the write-back operation to the write-through operation, depending on whether the battery state report indicates the battery 130 or the battery 230 of the controller enclosure 200 having the controller module 210 to which the local cache 111 is mirrored. When deciding to switch to the write-through operation, the switch determination unit 116 transmits a mirror data deletion request to the controller module 210 of a mirroring destination. The mirror data deletion request is transmitted to the mirroring destination, because the controller module 110 is switched to the write-through operation so that data is needless to be duplicated.

Upon receiving a mirror data deletion request from the controller module 320 that is the mirroring source of the mirror cache 112, the switch determination unit 116 deletes the mirror data contained in the mirror cache 112. The switch determination unit 116 transmits a mirror data deletion completion report to the controller module 320.

Also, the switch determination unit 116 receives a battery state report indicating that the battery is in a normal state, from a master controller module, as described later. The switch determination unit 116 determines whether to switch the access control unit 114 from the write-through operation to the write-back operation, depending on whether the battery state report indicates the battery 130 or the battery 230 of the controller enclosure 200 having the controller module 210 to which the local cache 111 is mirrored. When deciding to switch to the write-back operation, the switch determination unit 116 causes the controller module 210 to store mirror data of the data contained in the local cache 111, in the mirror cache 212.

Each of the controller modules 120, 210, 220, 310, and 320 includes a local cache, a mirror cache, a table memory unit, an access control unit, a monitor unit, and a switch determination unit, in the same way as the controller module 110. Each function is the same as the controller module 110, and thus the description will be omitted.

Here, a controller enclosure master and a master controller module will be described. One controller module is set as a controller enclosure master, from among controller modules included in each controller enclosure. For example, the controller module 110 is set as a controller enclosure master, from among the controller modules 110 and 120 included in the controller enclosure 100. The controller module 210 is set as a controller enclosure master, from among the controller modules 210 and 220 included in the controller enclosure 200. The controller module 310 is set as a controller enclosure master, from among the controller modules 310 and 320 included in the controller enclosure 300. Also, one controller module is set as a master controller module, from among the controller modules 110, 120, 210, 220, 310, and 320. For example, the controller module 110 is set as a master controller module. Note that one controller module may be set as both of a controller enclosure master and a master controller module.

The function of a controller enclosure master will be described. The function of a controller enclosure master is implemented by a monitor unit of a controller module set as a controller enclosure master. Here, the controller module 110 is assumed to be set as a controller enclosure master. The monitor unit 115 monitors the state of the battery 130. For example, the monitor unit 115 periodically performs polling to the battery 130 to monitor the state of the battery 130. Upon detecting that the battery 130 is in an abnormal state, the monitor unit 115 transmits a battery abnormal state report indicating that the battery 130 is in an abnormal state, to a master controller module. Note that information indicating which controller module is the master controller module is stored in a table memory unit of a controller module set as a controller enclosure master. Also, upon detecting that the battery 130 is in a normal state, the monitor unit 115 transmits a battery normal state report indicating that the battery 130 is in a normal state, to a master controller module.

Next, the function of a master controller module will be described. The function of a master controller module is implemented by a monitor unit of a controller module set as a master controller module. Here, the controller module 110 is assumed to be set as a master controller module. Upon receiving a battery abnormal state report or a battery normal state report from a controller enclosure master, the monitor unit 115 transmits a battery state report according to the received battery state, to every other controller module 120, 210, 220, 310, and 320. A battery state report includes information indicating which battery is in an abnormal state or a normal state.

FIG. 6 illustrates an example of a volume management table. The volume management table 113a is contained in the table memory unit 113. Also, the same volume management tables as the volume management table 113a are contained in all table memory units of other controller modules 120, 210, 220, 310, and 320. That is, data of the volume management table is synchronized in all of the controller modules 110, 120, 210, 220, 310, and 320.

The volume management table 113a includes fields of logical unit number (LUN), local cache, mirror cache, and physical memory region. The field of logical unit number includes entries of information for identifying logical units. The field of local cache includes entries of information for identifying controller modules provided with local caches corresponding to the logical units. The controller modules in the field of local cache control accesses to the corresponding logical units. The field of mirror cache includes entries of information for identifying controller modules provided with mirror caches corresponding to the logical units. The field of physical memory region includes entries of information indicating physical memory regions assigned to the logical units. For example, the field of physical memory region includes entries of identifiers of HDDs assigned to the logical units. Also, the field of physical memory region may include entries of address ranges for specifying assigned regions in HDDs.

Figure 7:
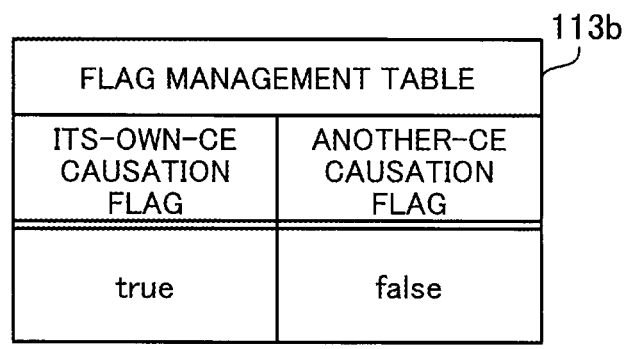
FIG. 7 illustrates an example of a flag management table.

FIG. 7 illustrates an example of a flag management table. The flag management table 113b is contained in the table memory unit 113. The flag management table 113b includes fields of its-own-controller-enclosure causation flag and another-controller-enclosure causation flag.

The field of its-own-controller-enclosure causation flag includes an entry of information indicating whether or not the causation of battery abnormal state is a battery of its own controller enclosure. Its own controller enclosure means the controller enclosure 100 provided with the controller module 110. As the its-own-controller-enclosure causation flag, "true" is set when the causation of battery abnormal state is a battery of its own controller enclosure, and "false" is set when the causation of battery abnormal state is not a battery of its own controller enclosure.

The field of another-controller-enclosure causation flag includes an entry of information indicating whether or not the causation of battery abnormal state is a battery of another controller enclosure. For example, another controller enclosure means the controller enclosure 200 provided with the controller module 210 to which the local cache 111 is mirrored. As the another-controller-enclosure causation flag, "true" is set when the causation of battery abnormal state is a battery of another controller enclosure, and "false" is set when the causation of battery abnormal state is not a battery of another controller enclosure.

Note that flag management tables having the same fields as FIG. 7 are stored in table memory units of other controller modules 120, 210, 220, 310, and 320. The flag management table in each controller module is utilized to determine whether to change the access control method of the access control unit in each controller module.

Figure 8:
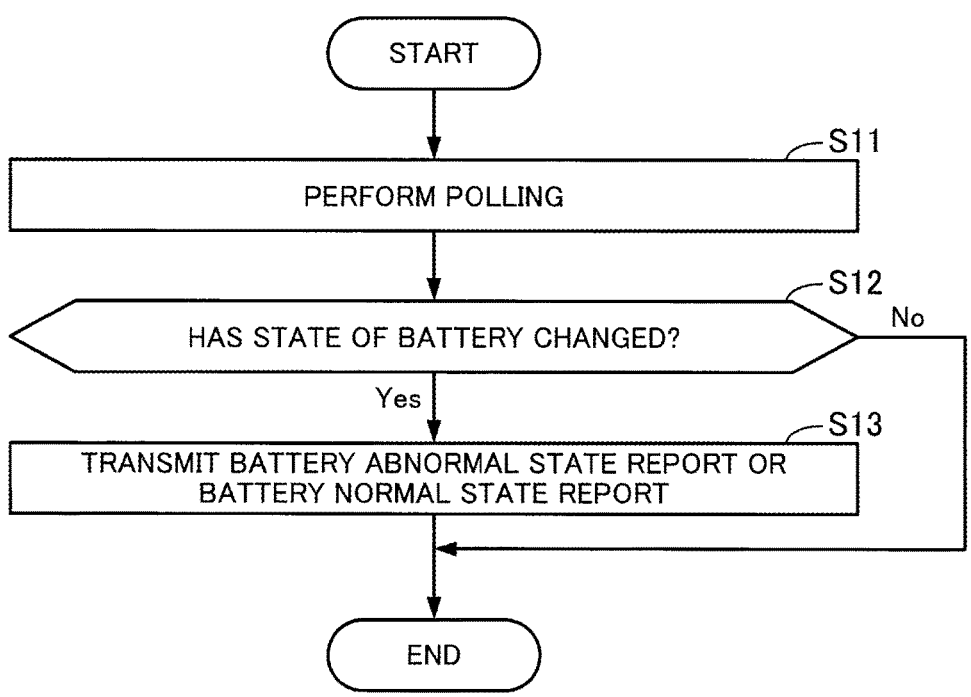
FIG. 8 is a flowchart illustrating an exemplary process for monitoring a battery state by a controller enclosure master.

FIG. 8 is a flowchart illustrating an exemplary process for monitoring a battery state by a controller enclosure master. In FIG. 8, the controller module 110 is assumed to be set as a controller enclosure master. In the following, the process illustrated in FIG. 8 will be described in the order of step numbers. The process of FIG. 8 is executed at constant time intervals.

(S11) The monitor unit 115 performs polling to the battery 130.

(S12) The monitor unit 115 determines whether the state of the battery 130 has changed from a normal state to an abnormal state or from an abnormal state to a normal state. Note that the monitor unit 115 determines that the battery 130 is in an abnormal state, when the battery 130 malfunctions, or when the charge rate of the battery 130 is smaller than a threshold value, for example. When the state of the battery 130 changes, the process proceeds to step S13. When the state of the battery 130 does not change, the process ends.

(S13) The monitor unit 115 transmits a report indicating the state of the battery 130, to a master controller module. If the monitor unit 115 has determined that the battery 130 has changed to an abnormal state in step S12, the monitor unit 115 transmits a battery abnormal state report indicating that the battery 130 is in an abnormal state. Also, if the monitor unit 115 has determined that the battery 130 has changed to a normal state in step S12, the monitor unit 115 transmits a battery normal state report indicating that the battery 130 is in a normal state. Then, the process ends.

Figure 9:
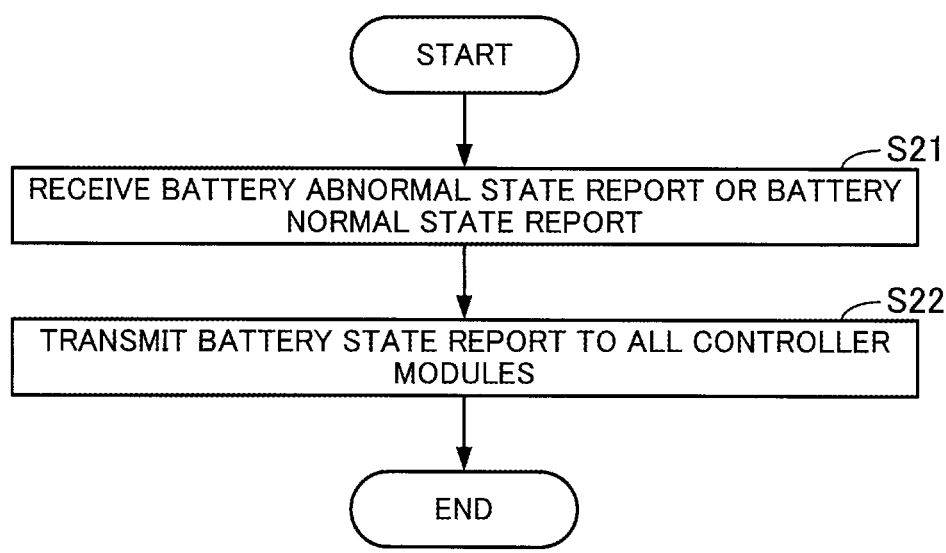
FIG. 9 is a flowchart illustrating an exemplary process of a master controller module when a change of a battery state is detected.

Note that, when the controller module 110 is a master controller module, the transmission process of step S13 is not executed, but instead the process at and after step S22 of next FIG. 9 is executed.

FIG. 9 is a flowchart illustrating an exemplary process of a master controller module when a change of a battery state is detected. In FIG. 9, the controller module 110 is assumed to be set as a master controller module. In the following, the process illustrated in FIG. 9 will be described in the order of step numbers.

(S21) The monitor unit 115 receives a battery abnormal state report or a battery normal state report from a controller enclosure master. The battery abnormal state report indicates which battery is in an abnormal state. Also, the battery normal state report indicates which battery is in a normal state.

(S22) The monitor unit 115 transmits a battery state report to the controller modules 120, 210, 220, 310, and 320. If the monitor unit 115 receives a battery abnormal state report in step S21, the monitor unit 115 transmits, to all controller modules, a battery state report including information indicating that a battery is in an abnormal state and an identifier of the battery in an abnormal state. If the monitor unit 115 receives a battery normal state report in step S21, the monitor unit 115 transmits, to all controller modules, a battery state report including information indicating a battery is in a normal state and an identifier of the battery in a normal state. Then, the process ends.

Figure 10:
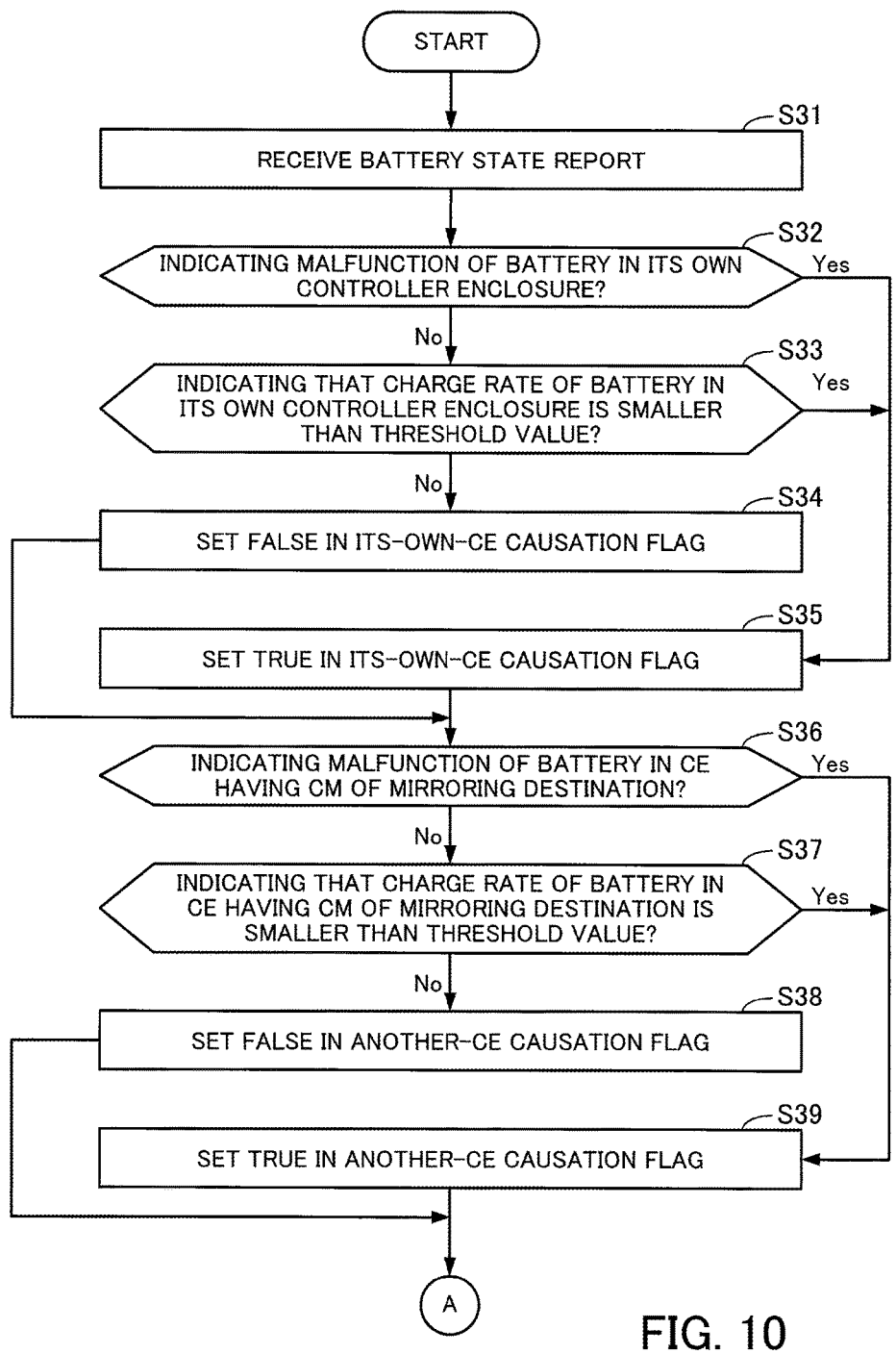
FIGS. 10 to 12 are a flowchart illustrating an example of a process of a controller module that receives a battery state report.

FIG. 10 is a flowchart illustrating an example of a process of a controller module when receiving a battery state report. The process illustrated in FIG. 10 is executed in all controller modules. FIG. 10 illustrates a case in which the process is executed by the controller module 110. In the following, the process illustrated in FIG. 10 will be described in the order of step numbers.

(S31) The switch determination unit 116 receives a battery state report from a master controller module. Note that, when the controller module 110 is a master controller module, step S31 is not executed. Instead, the process at and after step S32 is executed on the basis of the battery state report that the monitor unit 115 has transmitted in step S22 of FIG. 9.

(S32) The switch determination unit 116 determines whether or not the battery state report indicates malfunction of the battery 130 in the controller enclosure 100. If the battery state report indicates malfunction of the battery 130, the process proceeds to step S35. If the battery state report does not indicate malfunction of the battery 130, the process proceeds to step S33.

(S33) The switch determination unit 116 determines whether or not the battery state report indicates that the charge rate of the battery 130 in the controller enclosure 100 is smaller than a threshold value. If the battery state report indicates that the charge rate is smaller than the threshold value, the process proceeds to step S35. If the battery state report indicates that the charge rate is not smaller than the threshold value, the process proceeds to step S34.

(S34) The switch determination unit 116 sets false in the its-own-controller-enclosure causation flag of the flag management table 113b. Then, the process proceeds to step S36.

(S35) The switch determination unit 116 sets true in the its-own-controller-enclosure causation flag of the flag management table 113b.

(S36) The switch determination unit 116 identifies the controller module 210 to which the local cache in the controller module 110 is mirrored, with reference to the local caches and the mirror caches of the volume management table 113a. The switch determination unit 116 determines whether or not the battery state report indicates malfunction of the battery 230 in the controller enclosure 200 having the controller module 210. If the battery state report indicates malfunction of the battery 230, the process proceeds to step S39. If the battery state report does not indicate malfunction of the battery 230, the process proceeds to step S37.

(S37) The switch determination unit 116 determines whether or not the battery state report indicates that the charge rate of the battery 230 in the controller enclosure 200 having the controller module 210 of the mirroring destination is smaller than a threshold value. If the battery state report indicates that the charge rate is smaller than the threshold value, the process proceeds to step S39. If the battery state report indicates that the charge rate is not smaller than the threshold value, the process proceeds to step S38.

(S38) The switch determination unit 116 sets false in the another-controller-enclosure causation flag of the flag management table 113b. Then, the process proceeds to step S41.

(S39) The switch determination unit 116 sets true in the another-controller-enclosure causation flag of the flag management table 113b. Then, the process proceeds to step S41.

Figure 11:
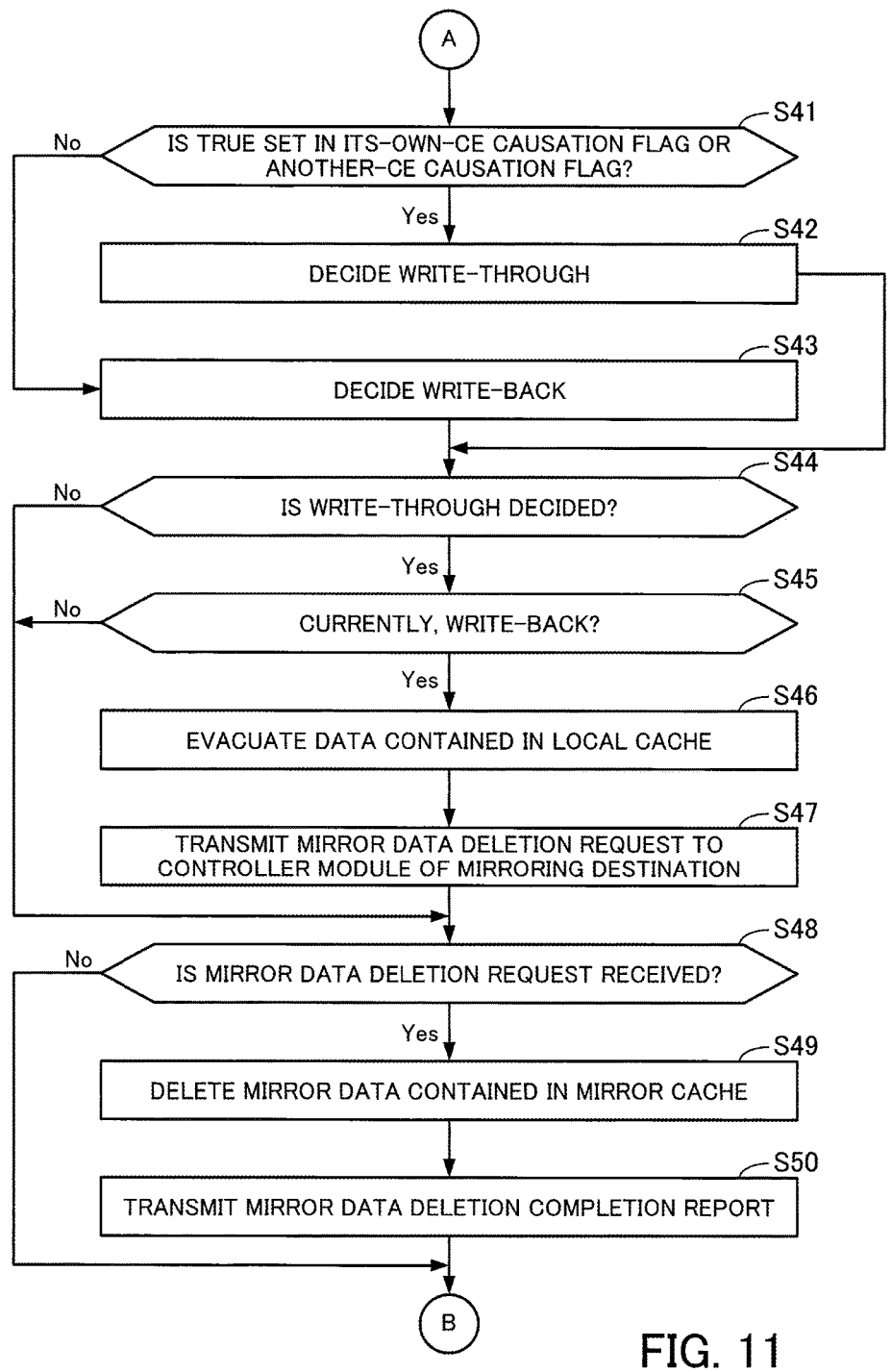

FIG. 11 is a flowchart illustrating the example (continuation) of the process of the controller module when receiving a battery state report. In the following, the process illustrated in FIG. 11 will be described in the order of step numbers.

(S41) The switch determination unit 116 determines whether or not true is set in the its-own-controller-enclosure causation flag or the another-controller-enclosure causation flag, with reference to the flag management table 113b. If true is set, the process proceeds to step S42. If true is not set, the process proceeds to step S43.

(S42) The switch determination unit 116 decides the write-through method as the write control method of the controller module 110. Then, the process proceeds to step S44.

(S43) The switch determination unit 116 decides the write-back method as the write control method of the controller module 110.

(S44) The switch determination unit 116 determines whether or not to have decided the write-through method as the write control method of the controller module 110. If the switch determination unit 116 have decided the write-through method, the process proceeds to step S45. If the switch determination unit 116 have not decided the write-through method, the process proceeds to step S48.

(S45) The switch determination unit 116 determines whether or not the current write control method of the controller module 110 is the write-back method. If the write-back method, the process proceeds to step S46. If not the write-back method, the process proceeds to step S48.

(S46) The switch determination unit 116 instructs the access control unit 114 to evacuate the data contained in the local cache 111. The instructed access control unit 114 evacuates the data contained in the local cache 111 to a region of the corresponding HDD, on the basis of the information of physical memory regions of the volume management table 113a.

(S47) The switch determination unit 116 transmits a mirror data deletion request to the controller module 210 of mirroring destination.

(S48) The switch determination unit 116 determines whether or not to have received a mirror data deletion request from the controller module 320. If a mirror data deletion request is received, the process proceeds to step S49. If a mirror data deletion request is not received, the process proceeds to step S51.

(S49) The switch determination unit 116 deletes the mirror data contained in the mirror cache 112.

(S50) The switch determination unit 116 transmits a mirror data deletion completion report to the controller module 320 that has transmitted the mirror data deletion request received in step S48. Then, the process proceeds to step S51.

Figure 12:
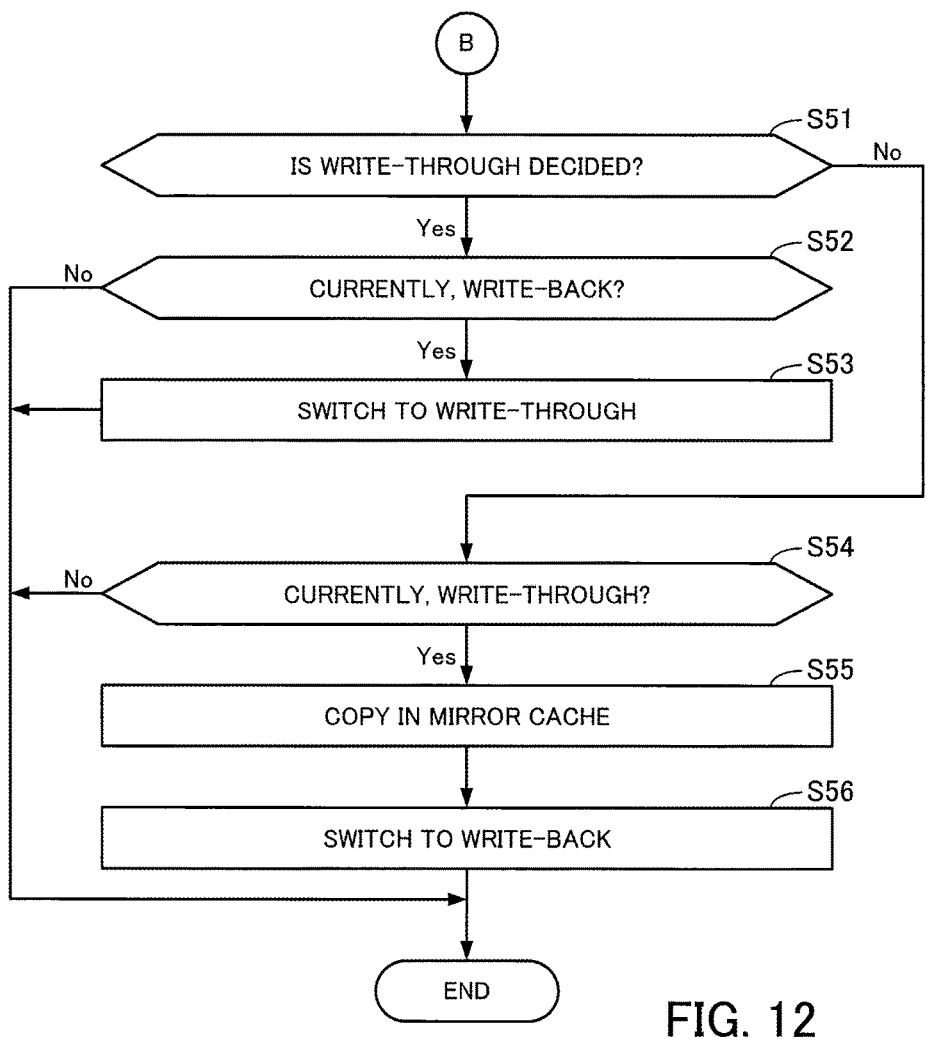

FIG. 12 is a flowchart illustrating the example (continuation) of the process of the controller module when receiving a battery state report. In the following, the process illustrated in FIG. 12 will be described in the order of step numbers.

(S51) The switch determination unit 116 determines whether or not to have decided the write-through method as the write control method of the controller module 110. If the switch determination unit 116 has decided the write-through method, the process proceeds to step S52. If the switch determination unit 116 has not decided the write-through method, the process proceeds to step S54.

(S52) The switch determination unit 116 determines whether or not the current write control method of the controller module 110 is the write-back method. If the write-back method, the process proceeds to step S53. If not the write-back method, the process ends.

(S53) The switch determination unit 116 instructs the access control unit 114 to switch the write control method from the write-back method to the write-through method. The instructed access control unit 114 starts write control of a logical unit by the write-through method. Note that the access control unit 114 does not mirror the write data for which a write is requested from the host device 700, in the mirror cache 212, when executing write control of a logical unit by the write-through method.

(S54) The switch determination unit 116 determines whether or not the current write control method of the controller module 110 is the write-through method. If the write-through method, the process proceeds to step S55. If not the write-through method, the process ends.

(S55) The switch determination unit 116 instructs the access control unit 114 to copy the local cache 111. The access control unit 114 detects the controller module 210 to which the local cache 111 is mirrored, with reference to the local caches and the mirror caches of the volume management table 113a. The access control unit 114 transmits a copy of the data contained in the local cache 111 to the controller module 210, and causes the controller module 210 to store the copied data in the mirror cache 212.

(S56) The switch determination unit 116 instructs the access control unit 114 to switch the write control method from the write-through method to the write-back method. The instructed access control unit 114 starts write control of a logical unit by the write-back method. Also, since then, when receiving a write request to a logical unit, the access control unit 114 stores write data in the mirror cache 212 and synchronizes the data in the local cache 111 and the mirror cache 212.

Figure 13:
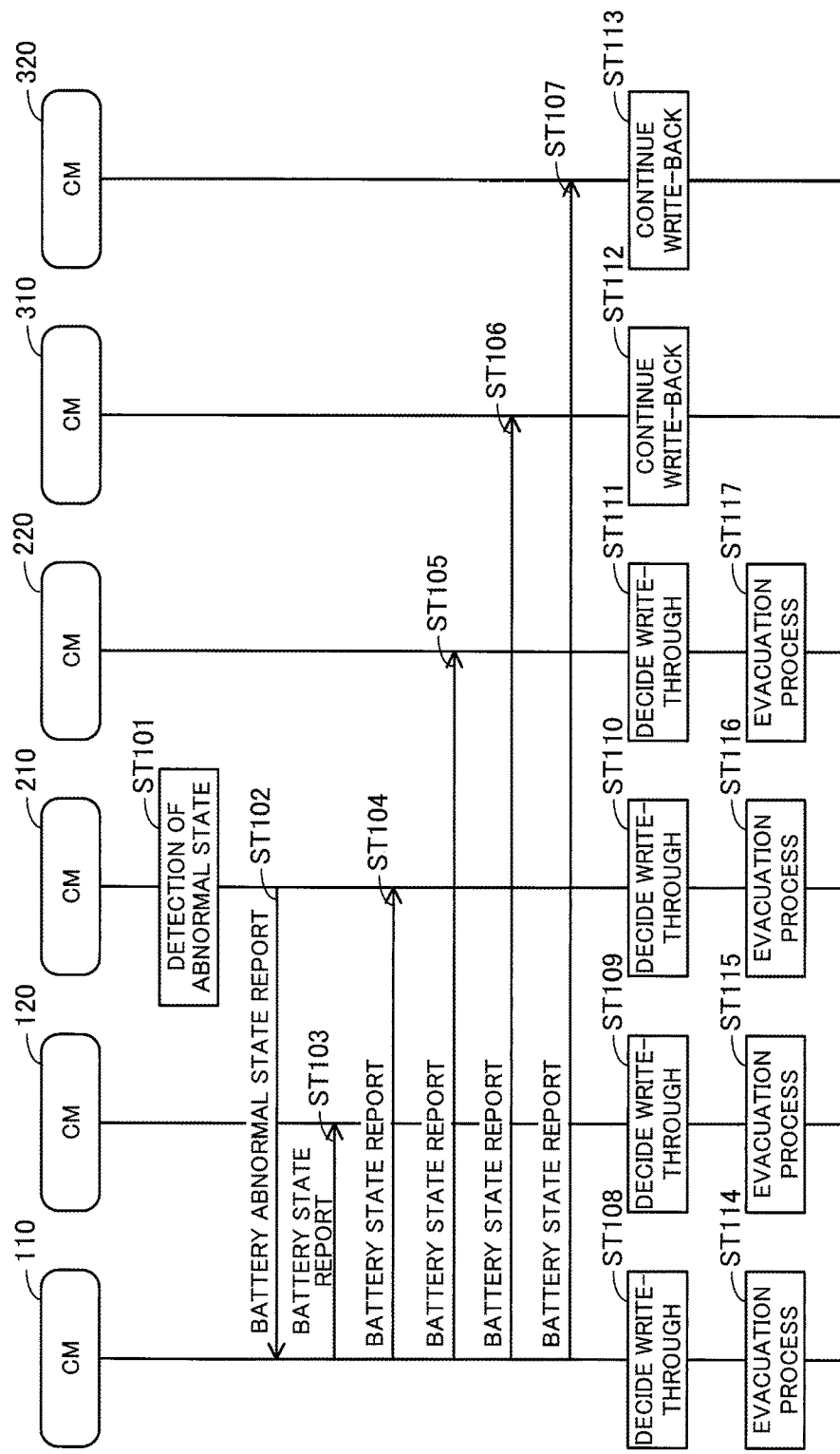
FIGS. 13 and 14 are a sequence diagram illustrating an exemplary process when a battery abnormal state is detected.

FIG. 13 is a sequence diagram illustrating an exemplary process executed when a battery abnormal state is detected. In FIG. 13, the controller module 110 is assumed to be set as a master controller module. Also, the controller modules 110, 210, and 310 are set as a controller enclosure master. Further, in all controller modules, write control of a logical unit is assumed to be executed by the write-back method. In the following, the process illustrated in FIG. 13 will be described in the order of step numbers.

(ST101) The controller module 210 detects that the battery 230 is in an abnormal state. For example, the controller module 210 detects malfunction of the battery 230.

(ST102) The controller module 210 transmits a battery abnormal state report indicating that the battery 230 is in an abnormal state, to the controller module 110.

(ST103) The controller module 110 transmits a battery state report indicating that the battery 230 is in an abnormal state, to the controller module 120.

(ST104) The controller module 110 transmits a battery state report indicating that the battery 230 is in an abnormal state, to the controller module 210.

(ST105) The controller module 110 transmits a battery state report indicating that the battery 230 is in an abnormal state, to the controller module 220.

(ST106) The controller module 110 transmits a battery state report indicating that the battery 230 is in an abnormal state, to the controller module 310.

(ST107) The controller module 110 transmits a battery state report indicating that the battery 230 is in an abnormal state, to the controller module 320.

(ST108) The controller module 110 determines that the battery 130 is not in an abnormal state. The controller module 110 determines an abnormal state of the battery 230 in the controller enclosure 200 having the controller module 210 to which the local cache 111 is mirrored. As the battery 230 is in an abnormal state, the controller module 110 decides the write-through method as the write control method of the controller module 110.

(ST109) The controller module 120 detects that the battery 130 is not in an abnormal state, from the battery state report. The controller module 120 determines an abnormal state of the battery 230 in the controller enclosure 200 having the controller module 220 to which the local cache 121 is mirrored, from the battery state report. As the battery 230 is in an abnormal state, the controller module 120 decides the write-through method as the write control method of the controller module 120.

(ST110) The controller module 210 determines that the battery 230 in the controller enclosure including the controller module 210 is in an abnormal state, from the battery state report. As the battery 230 is in an abnormal state, the controller module 210 decides the write-through method as the write control method of the controller module 210.

(ST111) The controller module 220 determines that the battery 230 in the controller enclosure including the controller module 220 is in an abnormal state, from the battery state report. As the battery 230 is in an abnormal state, the controller module 220 decides the write-through method as the write control method of the controller module 220.

(ST112) The controller module 310 determines that the battery 330 is not in an abnormal state, from the battery state report. The controller module 310 determines that the battery 130 in the controller enclosure 100 having the controller module 120 to which the local cache 311 is mirrored is not in an abnormal state, from the battery state report. Thereby, the controller module 310 continues write control of a logical unit by the write-back method.

(ST113) The controller module 320 determines that the battery 330 is not in an abnormal state, from the battery state report. The controller module 320 determines that the battery 130 in the controller enclosure 100 having the controller module 110 to which the local cache 321 is mirrored is not in an abnormal state, from the battery state report. Thereby, the controller module 320 continues write control of a logical unit by the write-back method.

(ST114) The controller module 110 evacuates the data contained in the local cache 111 to the corresponding HDD.

(ST115) The controller module 120 evacuates the data contained in the local cache 121 to the corresponding HDD.

(ST116) The controller module 210 evacuates the data contained in the local cache 211 to the corresponding HDD.

(ST117) The controller module 220 evacuates the data contained in the local cache 221 to the corresponding HDD.

Figure 14:
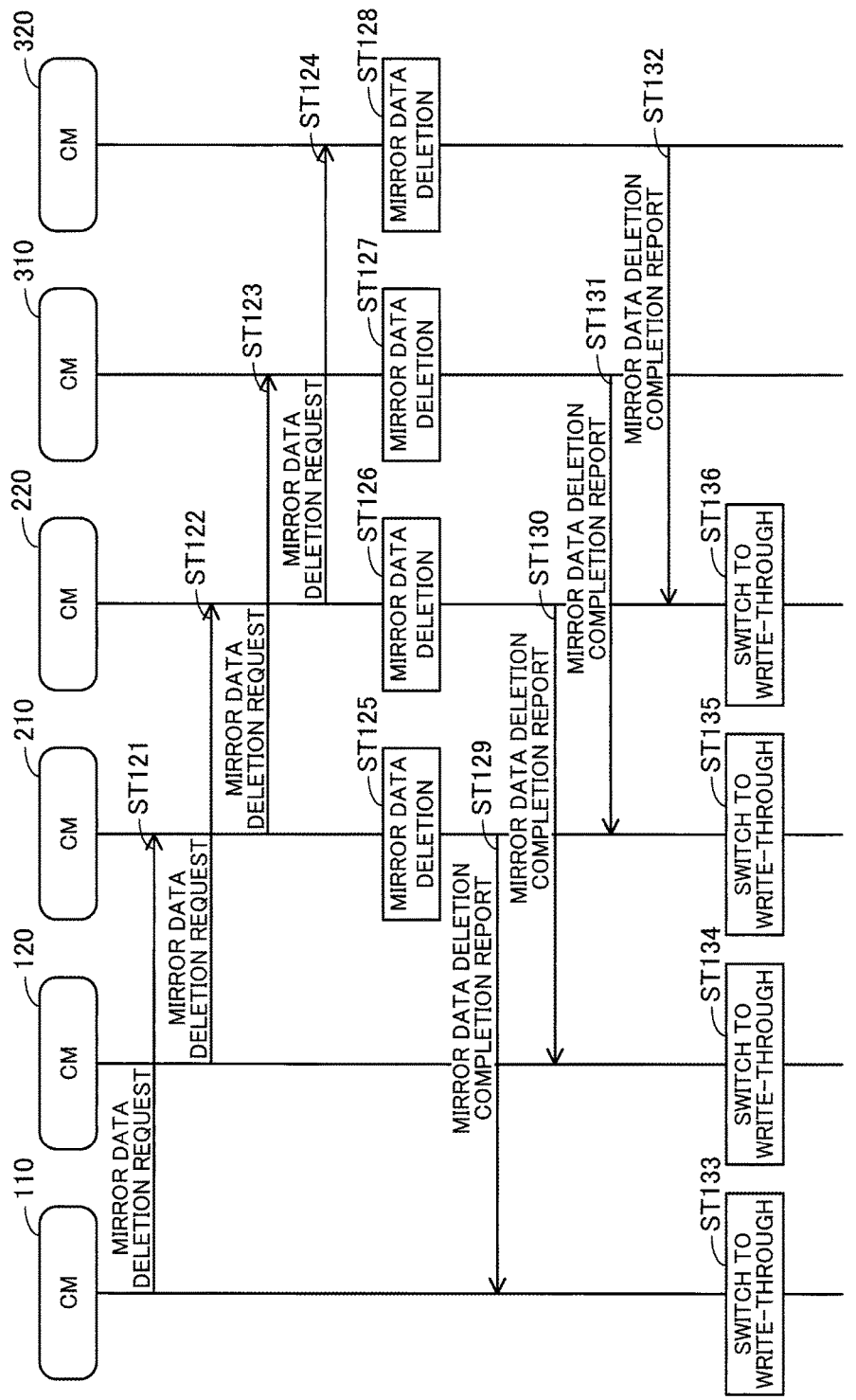

FIG. 14 is a sequence diagram illustrating the exemplary process (continuation) when a battery abnormal state is detected. In the following, the process illustrated in FIG. 14 will be described in the order of step numbers.

(ST121) The controller module 110 transmits a mirror data deletion request to the controller module 210 to which the local cache 111 is mirrored.

(ST122) The controller module 120 transmits a mirror data deletion request to the controller module 220 to which the local cache 121 is mirrored.

(ST123) The controller module 210 transmits a mirror data deletion request to the controller module 310 to which the local cache 211 is mirrored.

(ST124) The controller module 220 transmits a mirror data deletion request to the controller module 320 to which the local cache 221 is mirrored.

(ST125) The controller module 210 deletes the mirror data contained in the mirror cache 212.

(ST126) The controller module 220 deletes the mirror data contained in the mirror cache 222.

(ST127) The controller module 310 deletes the mirror data contained in the mirror cache 312.

(ST128) The controller module 320 deletes the mirror data contained in the mirror cache 322.

(ST129) The controller module 210 transmits a mirror data deletion completion report to the mirroring source controller module 110.

(ST130) The controller module 220 transmits a mirror data deletion completion report to the mirroring source controller module 120.

(ST131) The controller module 310 transmits a mirror data deletion completion report to the mirroring source controller module 210.

(ST132) The controller module 320 transmits a mirror data deletion completion report to the mirroring source controller module 220.

(ST133) The controller module 110 switches the logical unit write control method from the write-back method to the write-through method.

(ST134) The controller module 120 switches the logical unit write control method from the write-back method to the write-through method.

(ST135) The controller module 210 switches the logical unit write control method from the write-back method to the write-through method.

(ST136) The controller module 220 switches the logical unit write control method from the write-back method to the write-through method.

Note that, even after the controller module 110 is switched to the write-through method, the data contained in the local cache 321 is mirrored in the mirror cache 112. Thereby, data is duplicated in the local cache 321 and the mirror cache 112. In the same way, data is duplicated in the mirror cache 122 and the local cache 311, even after the controller module 120 is switched to the write-through method. Thus, even after an abnormal state of the battery 230 is detected, the controller modules 310 and 320 can continue the access control of logical units that the controller modules 310 and 320 are in charge of, while keeping the local caches 311 and 321 safe.

As described above, when an abnormal state of the battery 230 is detected, not only the controller modules 210 and 220 that receive electric power from the battery 230 at the time of power outage, but also the controller modules 110 and 120 having original data of the data mirrored in the controller modules 210 and 220, are switched from the write-back method to the write-through method. By switching the controller modules 110 and 120 to the write-through method, the data contained in the local caches 111 and 121 are stored in the corresponding physical memory regions, thereby reducing the possibility of losing data in the local caches 111 and 121.

Also, the controller modules 210 and 220 switched to the write-through method and the controller modules 310 and 320 that continue write-back do not perform mirroring of local caches. Thereby, processing loads of the controller modules 210, 220, 310, and 320 are reduced. Also, when reception of a write request from the host device 700 is followed by storing write data in the corresponding mirror cache and transmitting a write report, data is not mirrored in a mirror cache after switching to the write-through method, in order to shorten a write report time to the host device 700.

Figure 15:
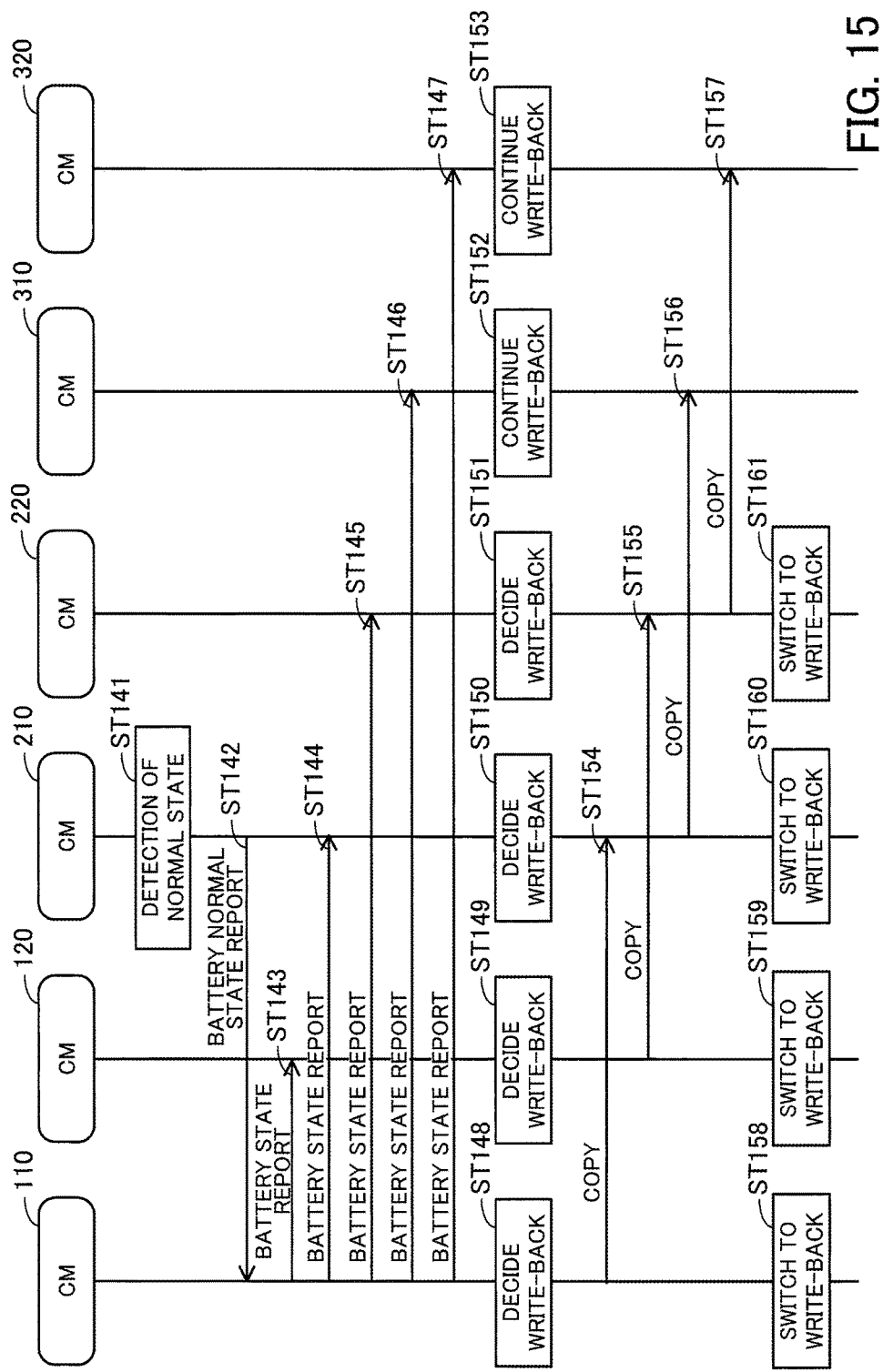
FIG. 15 is a sequence diagram illustrating an exemplary process when a battery normal state is detected.

FIG. 15 is a sequence diagram illustrating an exemplary process when a battery normal state is detected. FIG. 15 illustrates a case in which the battery 230 of the controller enclosure 200 changes to a normal state, after the process of FIG. 14. In the following, the process illustrated in FIG. 15 will be described in the order of step numbers.

(ST141) The controller module 210 detects that the battery 230 is in a normal state.

(ST142) The controller module 210 transmits a battery normal state report indicating that the battery 230 is in a normal state, to the controller module 110.

(ST143) The controller module 110 transmits a battery state report indicating that the battery 230 is in a normal state, to the controller module 120.

(ST144) The controller module 110 transmits a battery state report indicating that the battery 230 is in a normal state, to the controller module 210.

(ST145) The controller module 110 transmits a battery state report indicating that the battery 230 is in a normal state, to the controller module 220.

(ST146) The controller module 110 transmits a battery state report indicating that the battery 230 is in a normal state, to the controller module 310.

(ST147) The controller module 110 transmits a battery state report indicating that the battery 230 is in a normal state, to the controller module 320.

(ST148) The controller module 110 determines that the battery 130 is not in an abnormal state. The controller module 110 determines that the battery 230 in the controller enclosure 200 having the controller module 210 to which the local cache 111 is mirrored is not in an abnormal state. Thereby, the controller module 110 decides the write-back method as the write control method.

(ST149) The controller module 120 determines that the battery 130 is not in an abnormal state, from the battery state report. The controller module 120 determines that the battery 230 in the controller enclosure 200 having the controller module 220 to which the local cache 121 is mirrored is not in an abnormal state, from the battery state report. Thereby, the controller module 120 decides the write-back method as the write control method.

(ST150) The controller module 210 determines that the battery 230 is not in an abnormal state, from the battery state report. The controller module 210 determines that the battery 330 in the controller enclosure 300 having the controller module 310 to which the local cache 211 is mirrored is not in an abnormal state, from the battery state report. Thereby, the controller module 210 decides the write-back method as the write control method.

(ST151) The controller module 220 determines that the battery 230 is not in an abnormal state, from the battery state report. The controller module 220 determines that the battery 330 in the controller enclosure 300 having the controller module 320 to which the local cache 221 is mirrored is not in an abnormal state, from the battery state report. Thereby, the controller module 220 decides the write-back method as the write control method.

(ST152) The controller module 310 determines that the battery 330 is not in an abnormal state, from the battery state report. The controller module 310 determines that the battery 130 in the controller enclosure 100 having the controller module 120 to which the local cache 311 is mirrored is not in an abnormal state, from the battery state report. Thereby, the controller module 310 decides to continue the write control of logical units by the write-back method.

(ST153) The controller module 320 determines that the battery 330 is not in an abnormal state, from the battery state report. The controller module 320 determines that the battery 130 in the controller enclosure 100 having the controller module 110 to which the local cache 321 is mirrored is not in an abnormal state, from the battery state report. Thereby, the controller module 320 decides to continue the write control of logical units by the write-back method.

(ST154) The controller module 110 copies the data contained in the local cache 111 to the mirror cache 212 of the controller module 210.

(ST155) The controller module 120 copies the data contained in the local cache 121 to the mirror cache 222 of the controller module 220.

(ST156) The controller module 210 copies the data contained in the local cache 211 to the mirror cache 312 of the controller module 310.

(ST157) The controller module 220 copies the data contained in the local cache 221 to the mirror cache 322 of the controller module 320.

(ST158) The controller module 110 switches the logical unit write control method from the write-through method to the write-back method.

(ST159) The controller module 120 switches the logical unit write control method from the write-through method to the write-back method.

(ST160) The controller module 210 switches the logical unit write control method from the write-through method to the write-back method.

(ST161) The controller module 220 switches the logical unit write control method from the write-through method to the write-back method.

As described above, when the battery in an abnormal state becomes normal, the controller module that has been switched to the write-through method is switched to the write-back method again. This restarts mirroring of the local cache of a controller module into a controller module of another controller enclosure. Thereby, access performance to logical units in the controller module improves, while the local cache is kept safe.

Note that information processing of the first embodiment is achieved by causing the processors used in the control apparatuses 10, 20, and 30 to execute programs. Information processing of the second embodiment is achieved by causing the processor 110a and the processors included in the controller modules 120, 210, 220, 310, and 320 to execute programs. A program can be stored in a computer-readable storage medium.

For example, a program can be put in market, by distributing storage media storing the program. Also, separate programs may be created to provide respective functions of an access control unit, a monitor unit, and a switch determination unit in each controller module, and each program may be distributed separately. The respective functions of an access control unit, a monitor unit, and a switch determination unit in each controller module may be implemented in separate computers. For example, a computer may install a program stored in a storage medium into the RAM 110b or the SSD 110c and read the program from such a memory device in order to execute the program.

In one aspect, possibility of data loss is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage system comprising:
    a first memory device;
    a second memory device;
    a first control apparatus including:
    a first memory having a first cache region and a mirror cache region,
    a first power supply configured to supply electric power to the first memory,
    a battery configured to supply electric power to the first memory at a time of power outage of the first power supply, and
    a first processor configured to control a write into the first memory device by a write-back method by using the first cache region, and switch write control for the first memory device to a write-through method upon detecting an abnormal state of the battery; and
    a second control apparatus including:
    a second memory having a second cache region,
    a second power supply configured to supply electric power to the second memory, the second power supply being different from the first power supply, and
    a second processor configured to control a write into the second memory device by the write-back method by using the second cache region, and mirror data of the second cache region in the mirror cache region, and switch write control for the second memory device to the write-through method upon detecting an abnormal state of the battery.

2. The storage system according to claim 1, further comprising:
    a third memory device; and
    a third control apparatus including:
    a third memory having a third cache region,
    a third power supply configured to supply electric power to the third memory, the third power supply being different from the first power supply and the second power supply, and
    a third processor configured to control a write into the third memory device by the write-back method by using the third cache region, and mirror data of the third cache region in another mirror cache region of the second memory, and continue write control for the third memory device by the write-back method upon detecting an abnormal state of the battery.

3. The storage system according to claim 2, wherein the third processor mirrors the data of the third cache region in the other mirror cache region, after the write control for the second memory device by the second processor is switched to the write-through method.

4. The storage system according to claim 1, wherein the second processor stops mirroring the data of the second cache region in the mirror cache region, after switching the write control for the second memory device to the write-through method.

5. A control apparatus comprising:
    a first memory having a cache region;
    a first power supply configured to supply electric power to the first memory; and
    a processor configured to perform a procedure including:
    controlling a write into a memory device by a write-back method by using the cache region,
    mirroring data of the cache region in a mirror cache region included in one of a plurality of other control apparatuses, and
    determining whether the mirror cache region is included in a second memory that is included in one of the other control apparatuses and receives electric power from a second power supply that is different from the first power supply, upon detecting an abnormal state of a battery that supplies electric power to the second memory at a time of power outage of the second power supply, and
    switching write control for the memory device to a write-through method, when the second memory includes the mirror cache region.

6. A non-transitory computer-readable storage medium storing a control program that causes a computer to perform a procedure comprising:
    controlling a write into a memory device by a write-back method by using a cache region of a first memory included in the computer;
    mirroring data of the cache region in a mirror cache region included in one of a plurality of control apparatuses;
    determining whether the mirror cache region is included in a second memory that is included in one of the control apparatuses and receives electric power from a second power supply that is different from a first power supply for supplying electric power to the first memory, upon detecting an abnormal state of a battery that supplies electric power to the second memory at a time of power outage of the second power supply; and
    switching write control for the memory device to a write-through method, when the second memory includes the mirror cache region.

* * * * *